United States Patent [19]

Owen

[11] Patent Number: 5,375,254
[45] Date of Patent: Dec. 20, 1994

[54] METHOD OF OPERATING A COMMUNICATIONS SYSTEM, A COMMUNICATIONS SYSTEM AND A SECONDARY STATION FOR USE IN THE SYSTEM

[75] Inventor: Frank C. G. Owen, Chateroy Malabry, France

[73] Assignee: U.S. Phillips Corporation, Tarrytown N.Y.

[21] Appl. No.: 804,255

[22] Filed: Dec. 4, 1991

[30] Foreign Application Priority Data

Dec. 14, 1990 [GB] United Kingdom ............... 9027167.7

[51] Int. Cl.⁵ .................. H04B 7/00; H04B 17/02; H04B 1/16
[52] U.S. Cl. .................. 455/54.1; 455/161.1; 455/343
[58] Field of Search .............. 455/33.1, 33.2, 54.1, 455/56.1, 62, 63, 161.1, 161.2, 161.3, 127, 343; 379/58, 59, 63

[56] References Cited

U.S. PATENT DOCUMENTS

| | | | |
|---|---|---|---|
| 4,281,413 | 7/1981 | Forrest | 455/62 |
| 4,833,701 | 5/1989 | Comroe et al. | 455/33.2 |
| 4,977,611 | 12/1990 | Maru | 455/161.3 |
| 5,023,932 | 6/1991 | Wakana | 455/161.1 |
| 5,027,428 | 6/1991 | Ishiguro et al. | 455/343 |
| 5,109,530 | 4/1992 | Stengel | 455/343 |

Primary Examiner—Reinhard J. Eisenzopf
Assistant Examiner—Lisa Charouel
Attorney, Agent, or Firm—Leroy Eason

[57] ABSTRACT

A communications system, such as the DECT, comprises a plurality of geographically separate primary stations and a plurality of secondary stations which are able to roam relative to the primary stations. Communication between a primary and a secondary station is by way of any of a plurality of time division duplex radio channels. An idle primary station transmits an idle beacon signal. When a secondary station roams out of the coverage area of a primary station and so can longer lock to that primary station, it scans all of the radio channels for an idle beacon signal. To conserve battery power, instead of continuously rescanning all channels, the successive rescans are made less frequently as the time interval from when the secondary station was last in lock increases, until a predetermined maximum interval has been reached between successive rescans.

8 Claims, 3 Drawing Sheets

METHOD OF OPERATING A COMMUNICATIONS SYSTEM, A COMMUNICATIONS SYSTEM AND A SECONDARY STATION FOR USE IN THE SYSTEM

BACKGROUND OF THE INVENTION

1. Field of the Invention

The present invention relates to a method of operating a communications system in which secondary stations are able to roam in and out of respective radio coverage areas of a plurality of fixedly sited primary stations, the primary stations regularly transmitting idle beacon signals which are detectable by in range secondary stations operating in an idle locked state.

The invention also relates to such a communications system and to a secondary station for use therein.

2. Description of the Related Art

For convenience of description the invention will be described with reference to the DECT (Digital European Cordless Telecommunications) system, which comprises a plurality of time division duplex frequency channels which are accessed using a time division multiple access (TMDA) protocol. More particularly DECT comprises, for voice communication, one or more geographically separated primary or fixed base stations each having radio transceiving means defining a cell and a connection for example by landline, to the public switched telephone network (PSTN). One or more secondary or transportable, for example hand portable, stations having radio transceiving means are able to communicate by way of a radio link with an in-range primary station. The European Telecommunications Standards Institute (ETSI) currently provides that DECT shall have ten radio carrier channels, each divided into successive time frames of 10 milliseconds duration. Each frame is further divided into 24 equal time slots (or physical channels) which provide 12 time division duplex (TDD) channels termed duplex voice channels. The TDD arrangement is such that the nth and (n+12)th time slots, where n is an integer between 1 and 12, are a forward and reverse physical channels constituting the duplex voice channel. Each such pair of physical channels is capable of carrying one duplex digitized speech conversation or data at a rate of 1.152 Mbits/sec.

In setting up a voice call between a primary and a secondary station, a duplex voice channel is assigned to the transaction. The assignment of the duplex voice channel in any one of the radio carrier channels is by the method of dynamic channel allocation whereby a secondary station, taking into account its radio environment as determined by monitoring the average interference in each of the 120 pairs of physical channels, negotiates with the primary station for access to the best duplex voice channel currently available under the control of the primary station.

Currently the DECT specification requires base stations to continue transmissions on their last active forward physical channel so as to provide the system functions of broadcasting the basic system information, base station identity, and a frequency and frame timing reference. For convenience of description such transmissions will be called "normal idle beacon" transmissions. A secondary station in range of the primary station can remain tuned to the active forward physical channel but can power down. However the secondary station is powered-up for one frame (10 ms) in every 16 frames (or 160 ms) in order to be capable of receiving any paging transmissions addressed to it. Also, ideally the secondary station checks every 2 to 5 seconds whether it is correctly tuned to, and in synchronism with, the strongest or best primary station. A reason given for having these normal idle beacon transmissions is to save power at the secondary stations. However, when a secondary station wishes to make a call it must be able to scan rapidly the physical channels to obtain the best channel and then establish frame and slot synchronization using the normal idle beacon transmissions.

When a secondary station leaves its cell it may continuously scan all the duplex voice channels for another suitable primary station's idle beacon transmission. This continuous scanning by the secondary station consumes battery power which is wasted if the secondary station has moved out of the system's coverage area for a long period. One option to save battery power is to switch off the secondary, station but in order to do that the user must have realized that he is outside the coverage area. Also the user has to remember to switch on the secondary station when coming into range of a primary station to enable it to scan all the channels.

SUMMARY OF THE INVENTION

An object of the present invention is to reduce the battery powered consumed by a secondary station when out of the coverage area of a primary station.

According to a first aspect of the present invention there is provided a method of operating a communications system comprising at least one primary station having radio transceiving means and at least one secondary station having radio transceiving means, a secondary station being able to roam into and out of radio range of a primary station, wherein the primary and secondary stations are able to communicate with each other on any one of a plurality of channels. A primary station transmits during idle periods an idle beacon signal onto which an in-range secondary station can lock. Whenever a secondary station loses lock it scans the plurality of channels searching for an acceptable idle beacon signal. The frequency at which an out of range secondary station rescans the plurality of channels is varied in accordance with the increase in the time interval from when the secondary station was last in lock.

By progressively lengthening the secondary station's scan cycle once a communication system's coverage area has been left, battery power can be saved. In one actual example, the standby current of an idle secondary station was, after 20 minutes, reduced to 4 per cent of that which would have occurred had the normal idle transmission search been followed.

The progressive lengthening of the secondary station's scan cycle can be made adaptive on the basis that the longer a secondary station has been out of a primary station's coverage area the longer it is likely to remain so.

According to a second aspect of the present invention there is provided a communications system comprising at least one primary station and at least one secondary station which is able to roam relative to each primary station, each said primary and secondary station comprising radio transceiving means capable of transmitting on one of a plurality of channels, each primary station being capable of transmitting an idle beacon signal when not communicating with a secondary station, each secondary station being capable of scanning the plurality channels and locking onto an idle beacon signal. Each secondary station includes control means which, when the secondary station is unable to lock onto an idle beacon signal, varies the frequency at which the plurality of channels are scanned, such variation being in accordance with the increase in time from when the secondary station was last in lock.

According to a third aspect of the present invention there is provided a secondary station for operation in accordance with the method of the present invention. The secondary station comprises radio transceiving means for communicating with a primary station, and control means which in response to the secondary station losing lock with an idle beacon transmission from a primary station causes the transceiving means to scan other radio channels. The control means varies the frequency at which the radio channels are rescanned, such variation being in accordance with the increase in time from when the secondary station was last in lock.

BRIEF DESCRIPTION OF THE DRAWING

The present invention will now be described, by way of example, with reference to the accompanying drawings, wherein.

DESCRIPTION OF THE PREFERRED EMBODIMENTS

Figure 1:
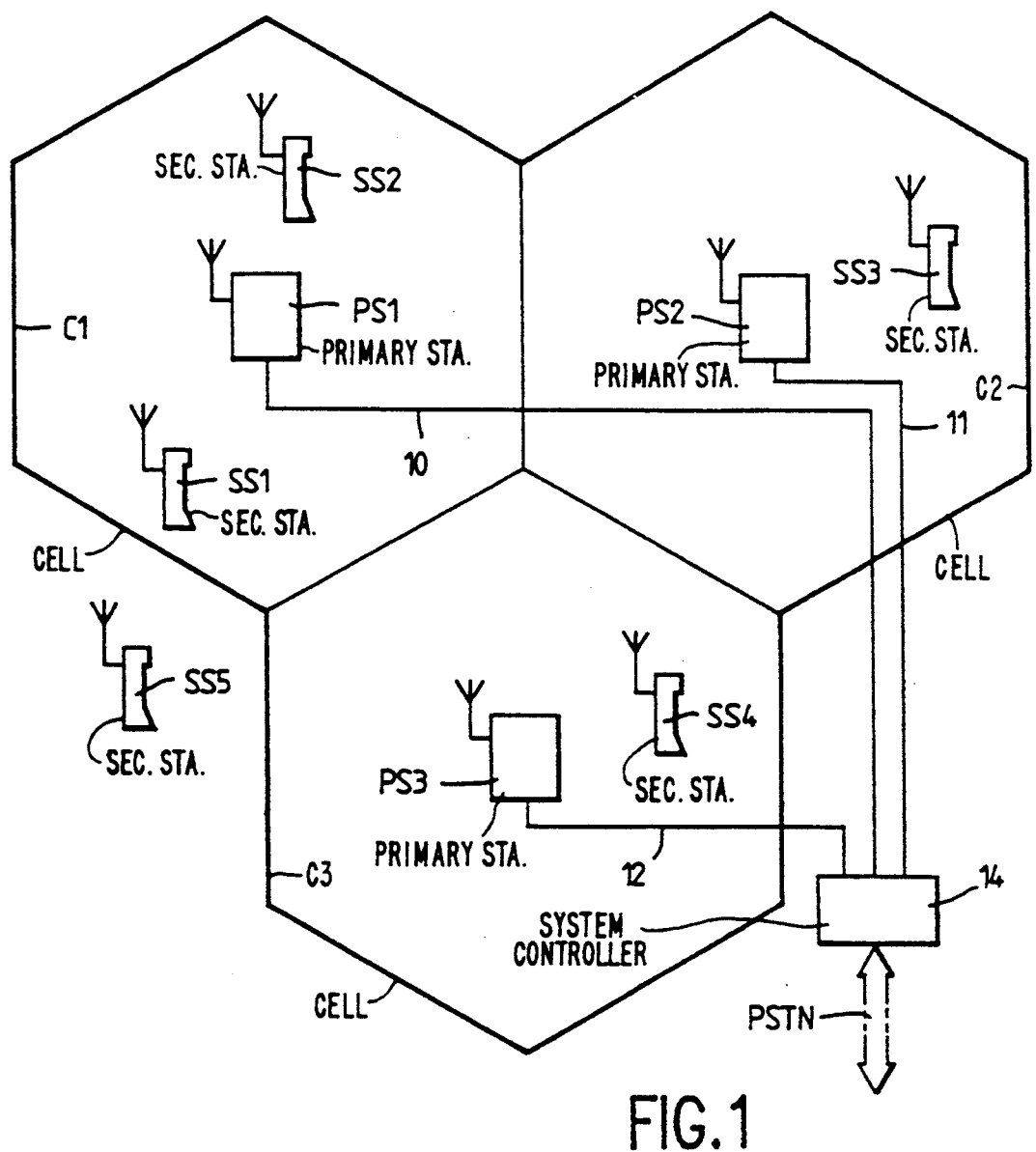
FIG. 1 illustrates diagrammatically a digital cordless telephone system.

In the drawings the same reference numbers have been used to indicate corresponding features.

The digital cordless telephone system shown in FIG. 1 comprises three geographically separated primary or fixed base stations PS1, PS2 and PS3. Each of the primary stations includes radio transceiving means, transmissions from which are receivable over respective areas termed cells C1, C2 and C3, the totality of which comprise a coverage area CA.

In FIG. 1 the cells C1, C2, C3 have been shown as regular hexagons but in reality the shapes of these cells are determined by the topology of the terrain and the nature of the local environment. As a result the boundaries of adjacent cells may be irregular and may overlap.

Each of the primary stations is connected by way of a respective wideband landline link 10, 11 and 12 capable of carrying multiple digitized speech conversations or data at a rate of say 1.152 Mbits/sec. to a cordless telephone system controller 14. The system controller 14 is, in the illustrated embodiment, connected to the public switched telephone network PSTN.

The system further comprises a large plurality of transportable, for example hand portable, secondary stations SS1 to SS5 which are able to roam into and out of a cell coverage area. Each secondary station includes radio transceiving means which is used for digital time division duplex speech communication with the primary station.

Figure 2:
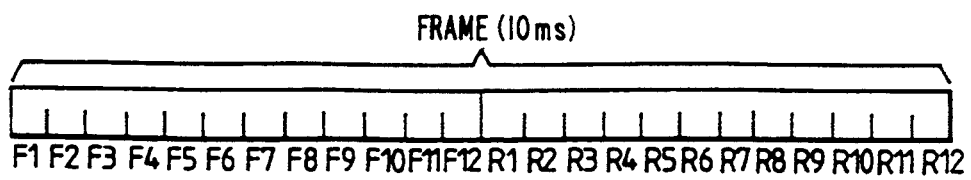
FIG. 2 is a diagram showing the DECT frame structure imposed on a carrier channel.

Referring to FIG. 2, the carrier channel is divided in the time domain into 10 ms frames. Each frame is divided into 24 time slots or physical channels of which the first twelve F1 to F12 are allocated for transmission in a forward direction, that is from a primary station to a secondary station, and the second twelve R1 to R12 are allocated for transmission in the reverse direction. The forward and reverse physical channels are twinned, that is, the correspondingly numbered forward and reverse physical channels, for example F4, R4, comprise a twin which hereinafter will be referred to as a duplex voice channel. In setting-up a call between a primary and a secondary station, a duplex voice channel is assigned to the transaction. The assignment of the duplex voice channel in any one of the carrier channels is by the method of dynamic channel allocation whereby a secondary station, taking account of its radio environment, negotiates with the primary station for access to the best duplex voice channel currently available under the control of the primary station. In DECT there are 10 carrier channels, which means that they can provide 120 duplex voice channels altogether. The duplex voice channels are reusable if the calls using the same duplex voice channel are sufficiently far apart that they do not interfere with each other.

The basic protocol for a transmission which is to be initiated by a secondary station SS is for it to listen to all the reverse physical channels in each of the carrier channels and ascertain which reverse physical channels are busy and idle and the relative signal quality in these reverse physical channels. From the information so derived the secondary station determines what it believes is the best available duplex voice channel, and transmits in the reverse physical channel thereof to a particular primary station PS. Signalling details in the message together with other details in the initial transmission are decoded and passed to the system controller 14, which sets-up the fixed network connection. The primary station confirms that the particular duplex voice channel has been assigned to the transaction.

In the forward direction, the primary stations send paging messages to addressed secondary stations in, say, every sixteenth frame. Such an arrangement enables the secondary stations to "sleep" during at least the intervening fifteen frames, thereby economizing on power. An addressed secondary station, in response to a paging request addressed to it, will transmit on the reverse physical channel of the best available duplex voice channel, which channel has been determined in advance by a process termed idle beacon monitoring.

Also during idle periods the primary station is required by the DECT system specification to continue transmissions in the forward physical channel of its last active duplex voice channel in what will be termed its normal idle beacon mode. The information so transmitted includes basic system information such as the base station identity and frequency and frame timing reference. Such system information is required by a secondary station when wishing in order to initiate a call.

When a secondary station such as station SS5 roams outside the coverage area of a cell it has been accepted practice that it will continuously scan all the duplex voice channels for another suitable base station's beacon transmission. This continuous scanning wastes battery power, as the secondary station may be out of range of a primary station for long periods. In accordance with the method of the present invention a secondary station, after failing if it fails to detect a beacon transmission by searching for a paging transmission once in every 16 frames, enters an adaptive battery economizing regime in which it scans the duplex voice channels less and less frequently until a fixed long scan cycle.

Figure 3:
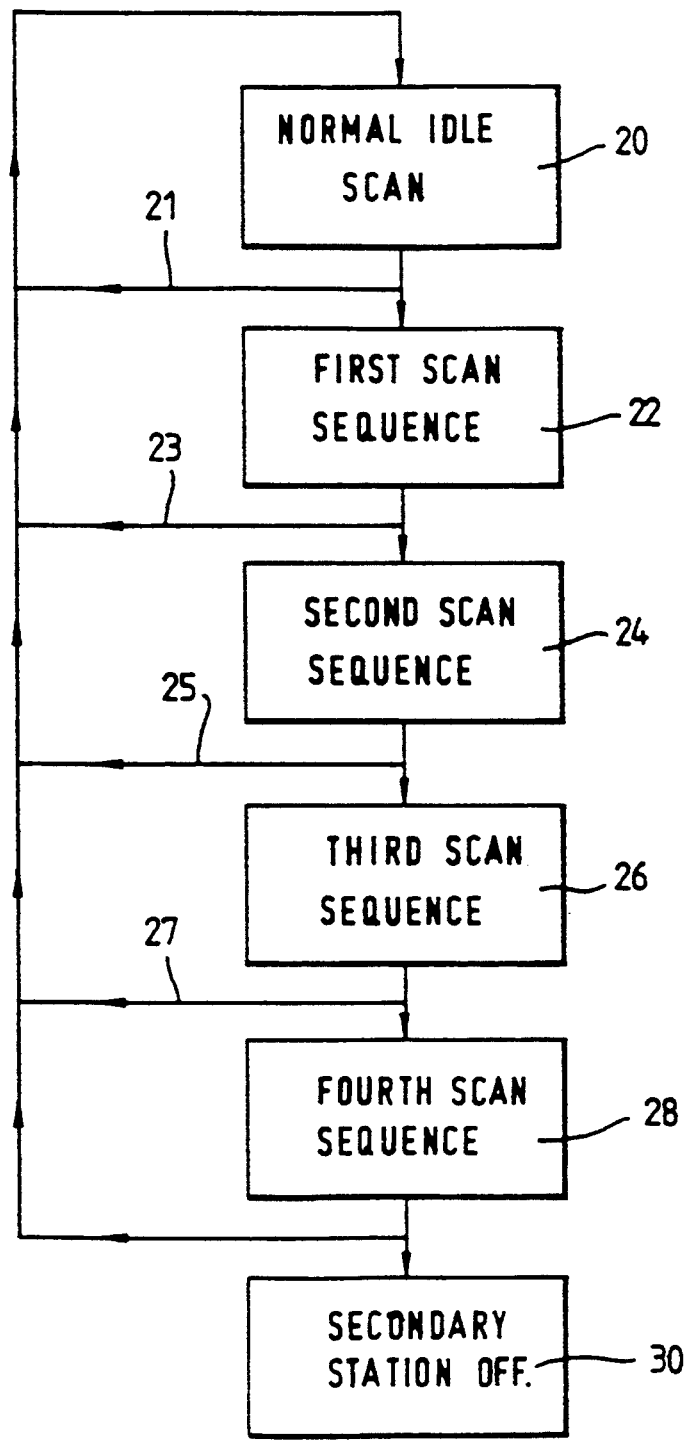
FIG. 3 is a flow chart of an algorithm for implementing the method in accordance with the present invention.

The control of the adaptive scan cycle is exercised by a control element 45 (FIG. 4) in the secondary station. FIG. 3 is a flow chart of one example of a suitable algorithm for the scan cycle. Therein the block 20 represents an idle-locked condition in which the secondary station powers up once in every 16 frames to monitor for paging messages. In this state the secondary station is within range of a primary station which for convenience will be termed its domestic primary station. As the signal quality from the domestic primary station is good, the secondary station has no need to scan for a better duplex voice channel.

If when in this mode, the paging messages disappear, then the secondary station immediately scans the duplex voice channels seeking beacon signals and assuming that it locates a channel, it enters a new idle-locked state and the algorithm returns via a line 21 back to the idle-locked state, block 20.

However if no beacon signals and/or calls are detected, then the secondary station enters the first state of an adaptive scan cycle which state is indicated by the block 22. In this first state, the secondary station is powered up to scan all the duplex voice channels and then powers-down for 2 seconds before repeating the scan. This continues for an overall period 2 minutes. If a usable beacon signal is detected, then the secondary station locks to that channel and enters a new idle-locked state and the algorithm reverts to block 20 via the line 23.

If a usable channel is still not found the algorithm enters a second state, block 24, in which the secondary station makes one scan through all the duplex voice channels every 10 seconds for a maximum of 6 minutes. If a usable beacon signal is detected, then the secondary station locks to that channel and enters a new idle-locked state and the algorithm reverts to the block 20 via the line 25.

In the case of a usable channel still not being found, the algorithm enters a third state, block 26, in which the secondary station makes one scan through all the duplex voice channels every 20 seconds for a maximum of 10 minutes. If a useful beacon signal is detected than the secondary station enters a new idle-locked state on that channel and the algorithm reverts to the block 20 via the line 27.

The algorithm enters a fourth state, block 28, in response to a usable channel still not being found. In the fourth state, the secondary station makes one scan of all the duplex voice channels every 3 minutes. This scan cycle continues indefinitely until either a beacon signal is detected, in which case the secondary station assumes an idle-locked condition, block 20, or the secondary station is de-energized by it being switched-off or the batteries going flat, which state is indicated by the block 30.

A simulation of this algorithm has shown that a secondary station outside a coverage area will, after 20 minutes, have consumed only 4% of the current which would have been used if the secondary station had remained in idle-locked state represented by the block 20. The algorithm described is based on the principle that the longer a secondary station has been out of a coverage area the longer it is likely to remain so. Naturally, the rescan intervals denoted by the four states 22, 24, 26 and 28 can be varied to suit a particular application. Also the rescan intervals can be chosen to suit a particular user, as it has no effect on the operation of the primary stations. If desired the control element in the secondary station may be programmed to accumulate statistics of-the system operation and how often the user moves outside the coverage area, and determine the rescan interval accordingly.

When a secondary station re-enters an idle-locked state after having been outside the coverage area there will be a delay of the order of one and a half minutes, so that an acceptable primary station can be located.

Figure 4:
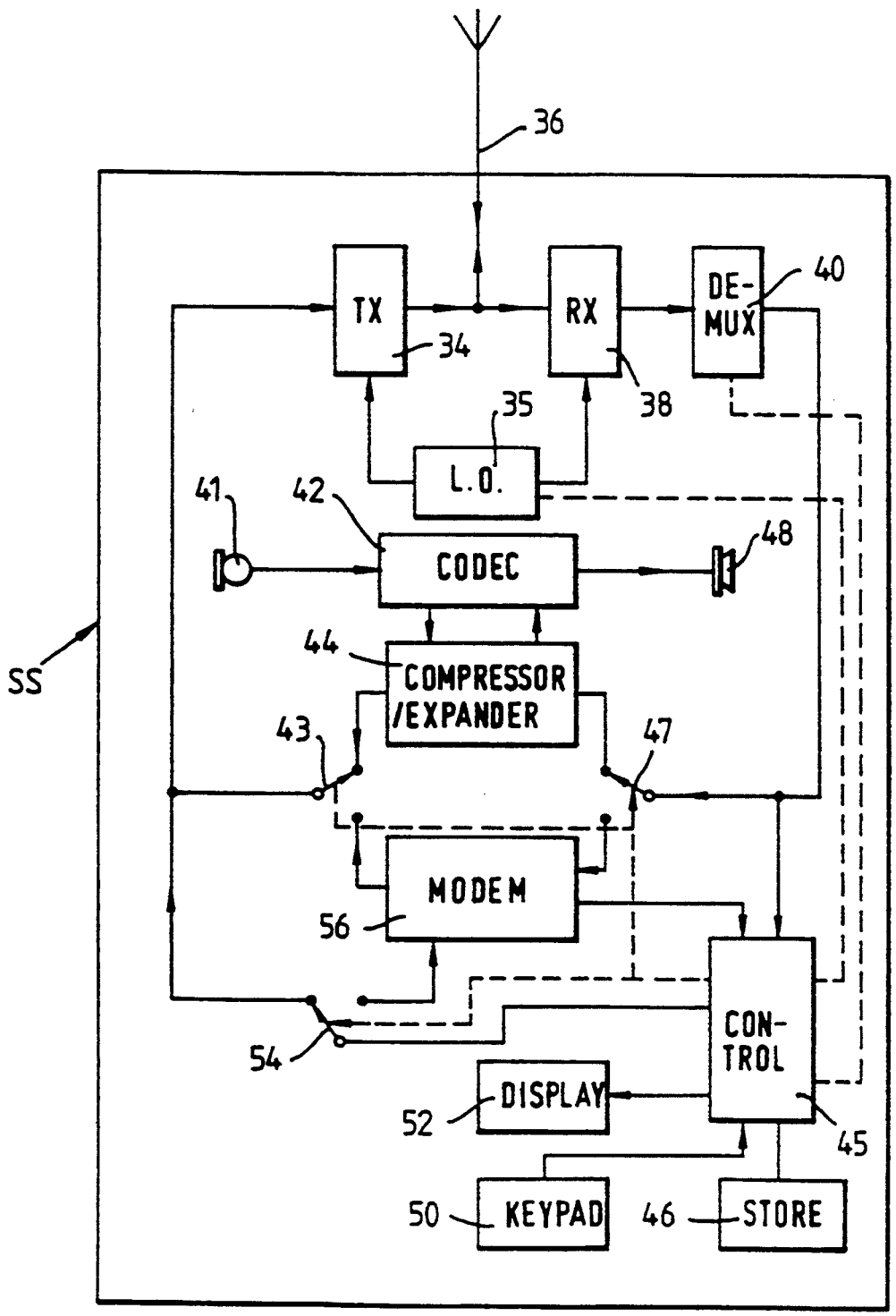
FIG. 4 is a block schematic diagram of a secondary station suitable for use in the system shown in FIG. 1.

FIG. 4 is a block schematic diagram of a secondary station SS suitable for implementing the method and system in accordance with the present invention. The secondary station SS comprises a transmitter 34 connected to an antenna 36 which is also connected to a receiver 38. A demultiplexer 40 is included in the received signal circuit to distinguish a digitized speech signal other data signals.

A microphone 41 is connected to a CODEC 42 which includes storage for the digitized speech. The CODEC 42 operates at 32 kbits/sec. The CODEC 42 is connected to a data compressor/expander 44 which compresses the digitized speech into bursts having a data rate of the speech at 1.152 Mbits/sec. A control element 45 is provided which controls the operation and internal organization of the secondary station and which has a store 46 connected to it for storing amongst other things details of the usage and quality of all the duplex voice channels. At the occurrence of a reverse time slot or physical channel in the best available duplex voice channel, as decided by the control element 45, a burst of compressed digitized speech is then relayed by way of a change-over switch 43 to the transmitter 34 whose frequency channel has been predetermined by the control element 45 applying control signals to a local oscillator 35 as part of the choice of the best available duplex voice channel.

The received digitized speech in the forward time slot or physical channel is relayed by way of a change-over switch 47 to the data compressor/expander 44 in which it is expanded to digitized speech having a data rate of 32 kbits/sec. and passed to the CODEC 40 and then to a loudspeaker or other audio transducer 48.

A keypad 50 is connected to the control element 45, for keying-in data such as a called party's telephone number. The control element 45 causes the keyed-in data to be displayed on a display device 52. The control element 45 also adds the necessary signalling to the keyed-in data which is conveyed by way of a change-over switch 54 to the transmitter 34.

The switches 43, 47 and 54 are controlled by the control element 45.

Assuming that the secondary station is operating in a normal idle beacon mode, at least its transmitter 34 and receiver 38 are powered down. At least the receiver is powered up by instructions generated by the control element 45 to listen for paging signals every 160 ms and to listen for frequency and framing information once in every 2 to 5 seconds. Such signals and information are detected by the demultiplexer 40, which signals the presence of data signals to the control element 45 and which in response thereto changes over the switches 43, 47 and 54. The signal and/or information is decoded in a MODEM 56 and the message information is supplied to the control element 45.

The control element 45 contains the algorithm for adaptively rescanning the duplex voice channels in the event of the secondary station roaming outside the coverage area.

For convenience of description, the present invention has been described with reference to DECT. However, the method in accordance with the present invention may be used in other suitable systems.

From reading the present application, other modifications will be apparent to persons skilled in the art. Such modifications may involve other features which are already known in the design, manufacture and use of digital cordless telephone systems and devices and component parts thereof and which may be used instead of or in addition to features already described herein. Although claims have been formulated in this application to particular combinations of features, it should be understood that the scope of the disclosure of the present application covers combination of features disclosed herein either explicitly or implicitly, or any generalization thereof, whether or not they relate to the same invention as presently claimed in any claim and whether or not they mitigate any or all of the same technical problems as does the present invention. The applicants hereby give notice that new claims may be formulated to such features and/or combinations of such features in further patent applications derived herefrom or otherwise.

I claim:

1. A method of operating a communications system comprising a plurality of primary stations and at least one secondary station, said primary stations and said secondary station each having radio transceiving means which provide a plurality of radio channels for communication between said secondary station and each of said primary stations, said secondary station being able to roam in and out of radio range with at least one of said primary stations; said method comprising the steps of:

transmitting by each primary station, which idle, an idle beacon signal to which said secondary station can lock when it is in radio range of an idle primary station;

scanning of said plurality of channels by said secondary station to search for the idle beacon signal to which it can lock; and periodic rescanning of said channels by the secondary station at a rescan frequency which decreases in relation to an increase in the time interval from when the secondary station was last in lock with the idle beacon signal.

2. A method as claimed in claim 1, wherein the rescan frequency is decreased in predetermined steps in relation to the increase in the time interval from when the secondary station was last in lock with the idle beacon signal.

3. A method as claimed in claim 2, wherein the rescan frequency is maintained at a last of said predetermined steps until said secondary station either locks to the idle beacon signal or is de-energized.

4. A method as claimed in claim 1, wherein the rescan frequency is adapted in accordance with operating characteristics of the system.

5. A communications system comprising a plurality of primary stations and at least one secondary station, the primary stations and the secondary station each having radio transceiving means which provide a plurality of radio channels for communication between the secondary station and each of the primary stations; each primary station, when idle, transmitting an idle beacon signal to which the secondary station can lock when received thereby; the secondary station scanning the plurality of channels to search for the idle beacon signal to which it can lock; characterized in that the secondary station comprises control means for causing periodic rescanning of said plurality of channels at a rescan frequency which decreases in relation to an increase in the time interval from when the secondary station was last in lock with the idle beacon signal.

6. A communications system as claimed in claim 5, wherein said control means decreases the rescan frequency in predetermined steps until a predetermined maximum interval has been reached between successive rescans.

7. A secondary station for use in a communications system which comprises at least one said secondary station and a plurality of primary stations, said secondary station and the primary stations each having radio transceiving means which provide a plurality of radio channels between said secondary station and each of the primary stations, each primary station, when idle transmitting an idle beacon signal to which said secondary station can lock when received thereby; characterized in that said secondary station includes control means for causing scanning of said plurality of channels to search for the idle beacon signal to which it can lock, and to periodically rescan said plurality of channels at a rescan frequency which decreases in relation to an increase in the time interval from when said secondary station was last in lock with the idle beacon signal.

8. A secondary station as claimed in claim 7, wherein said control means decreases the rescan frequency in predetermined steps until a predetermined maximum interval has been reached between successive rescans.

* * * * *